July 30, 1946.                W. H. COOK                2,405,016
                        PISTON AND CYLINDER DEVICE
                    Filed July 21, 1943      4 Sheets-Sheet 1
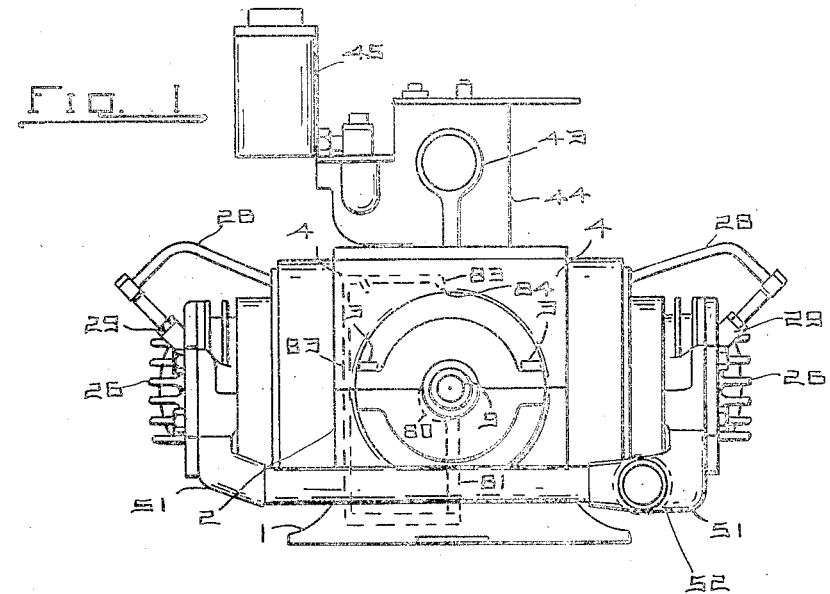
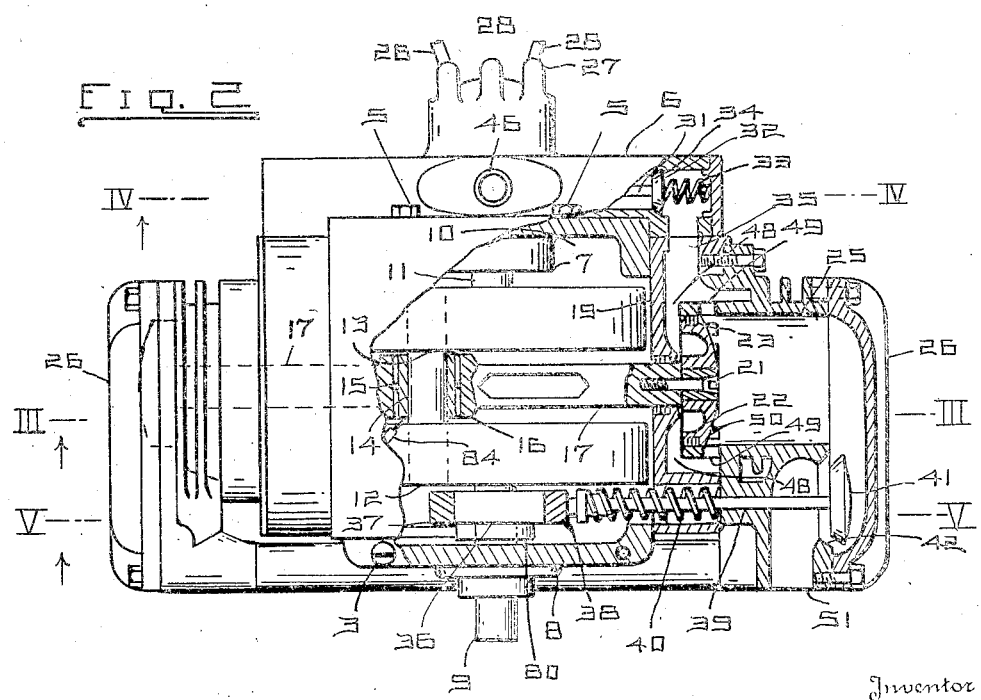
Inventor
WILLIAM H. COOK
By
Attorney

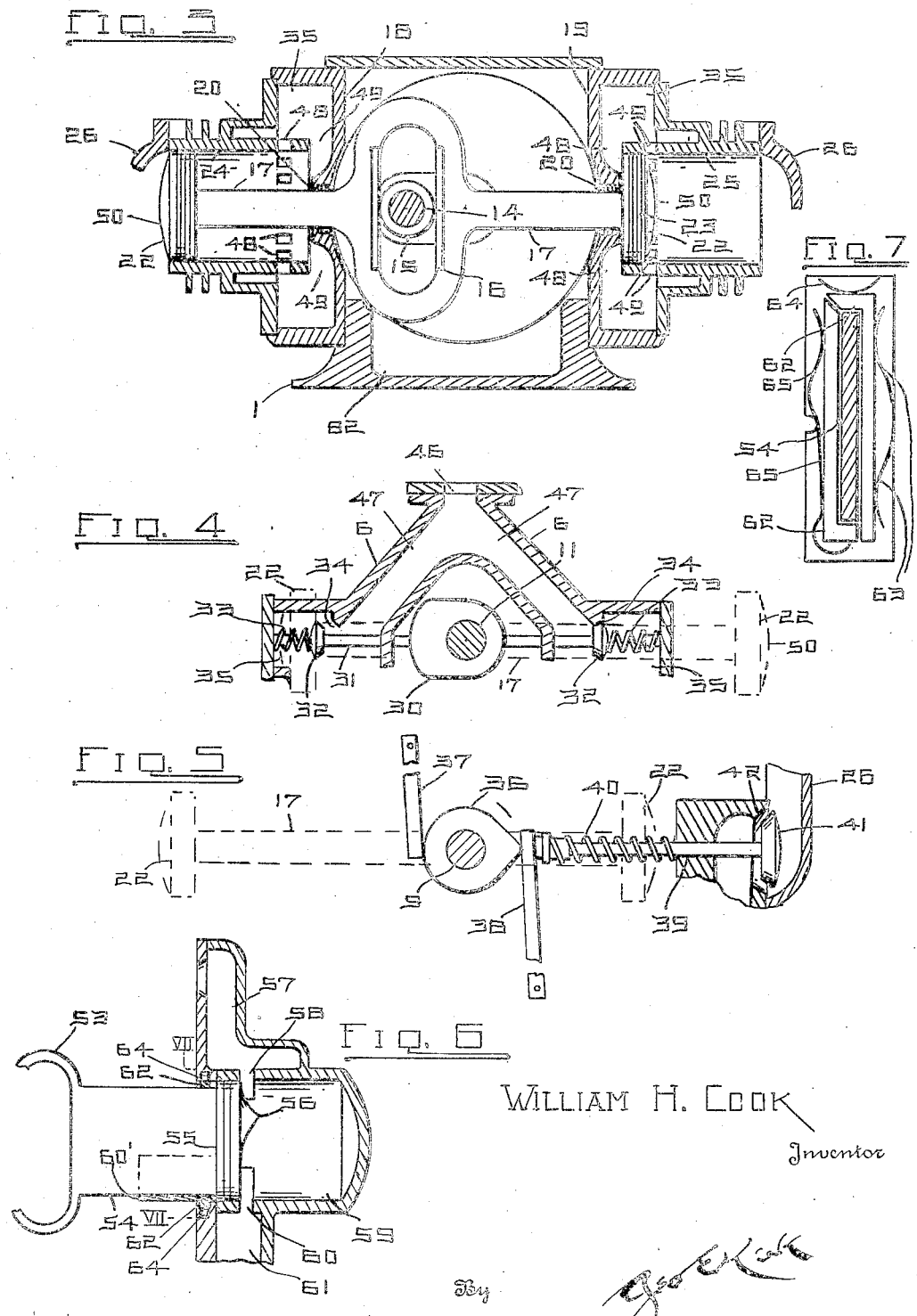

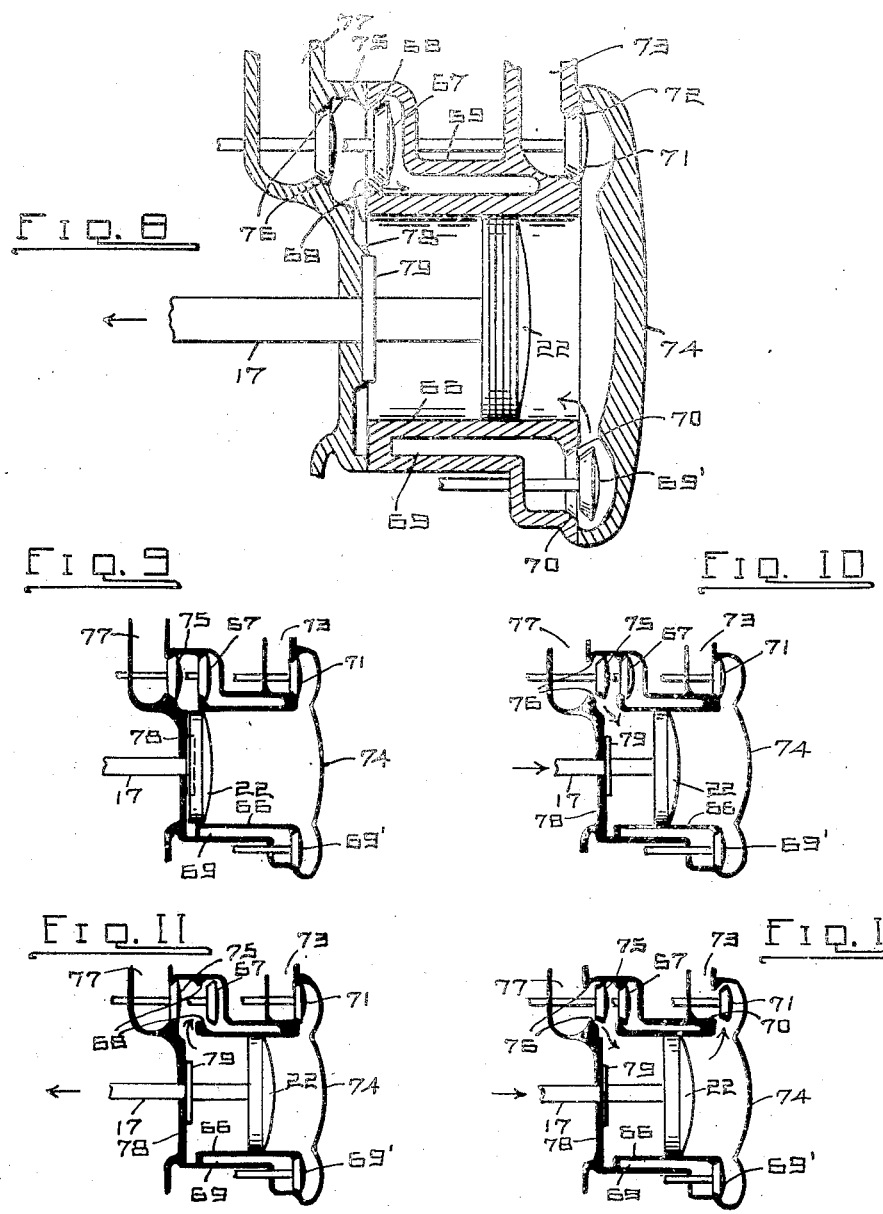

July 30, 1946. W. H. COOK 2,405,016
PISTON AND CYLINDER DEVICE
Filed July 21, 1943 4 Sheets-Sheet 4

WILLIAM H. COOK, Inventor

By _____ Attorney

Patented July 30, 1946

2,405,016

UNITED STATES PATENT OFFICE 2,405,016

PISTON AND CYLINDER DEVICE

William H. Cook, Toledo, Ohio

Application July 21, 1943, Serial No. 495,597

3 Claims. (Cl. 123—56)

This invention relates to direct connected opposed pistons, more particularly in prime movers, with the assembly and control features therefor.

This invention has utility when incorporated in internal combustion motors, having precompression features therewith.

Referring to the drawings:

Fig. 1 is an elevation of an embodiment of the invention in a two cylinder two cycle type of internal combustion engine, viewed from the power take off end thereof;

Fig. 2 is a plan view of the motor of Fig. 1, parts being broken away;

Fig. 3 is a view of the inter-piston connection or yoke, on the line III—III, Fig. 2;

Fig. 4 is a view of the fuel intake cam and valves, on the line IV—IV, Fig. 2;

Fig. 5 is a view of the exhaust cam and valves, on the line V—V, Fig. 2;

Fig. 6 is a sectional view of a flat piston rod and deflector piston features, departing from the showing in Fig. 3;

Fig. 7 is a view of piston rod packing, on the line VII—VII, Fig. 6;

Fig. 8 is an adaptation of the motor of Fig. 2 for four cycle;

Fig. 9 is a showing of full gas intake from the start in Fig. 8;

Fig. 10 shows the valve positions on the compression stroke;

Fig. 11 is a showing of the firing stroke for the cycle;

Fig. 12 is for the scavenge stroke, from which there is in sequence the cycle stages again of Figs. 8 to 12 inc.;

Figure 13:
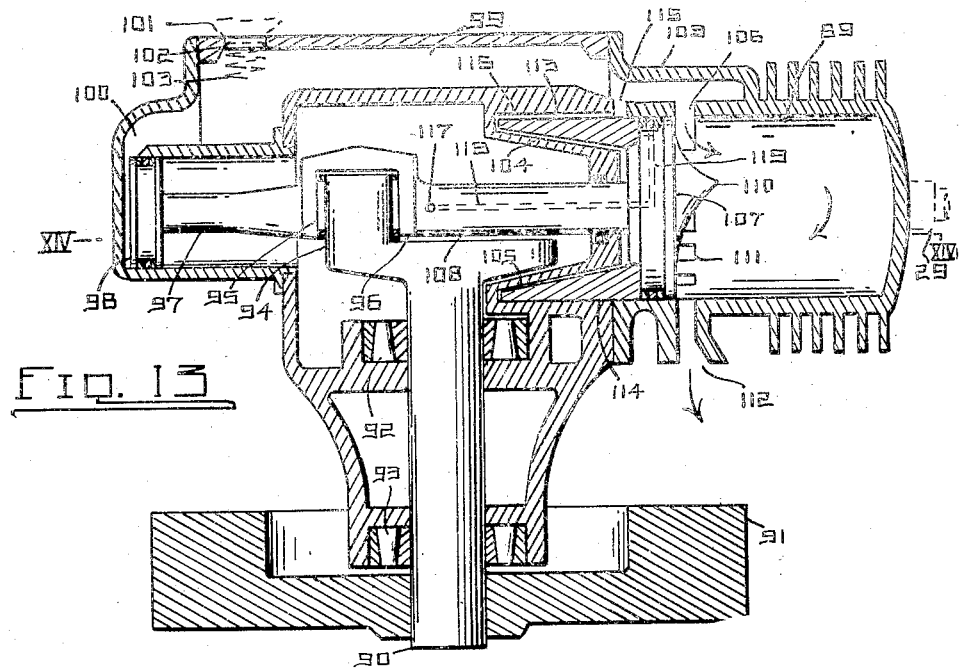
Fig. 13 is a section in the plane of the shaft of a single power cylinder embodiment in a two-cycle type of motor.

A motor base 1 has a case 2 rising therefrom. Bolts 3 (Fig. 1) connect upper section 4 of the casing at one end. Bolts 5 mount manifold member 6 at the opposite end of the casing. Aligned bearings 7, 8, mount take off shaft section 9 to extend into case providing chamber 10, from the opposite end of which extends shaft section 11. The antifriction bearings 7, 8, have disposed therebetween a flyweight disk 12 fixed with the shaft section 9 (Fig. 2), and a flyweight similar disk 13 fixed with the shaft section 11. Eccentric wrist or crank pin 14 is fixed with the pair of flyweights and has clearance therebetween for antifriction bearing 15. The wrist pin bearing 15 is in a slide 16 of a yoke, having centrally from opposite sides thereof, and rigid therewith, piston rods 17 (Fig. 3), integral with the slide of the yoke. Closure plates 18, 19, provide aligned glands or piston ring carrying guides 20 for the rods 17. The axes of the rods 17 and the shaft sections 9, 11, lie in a common plane. Bolts 21 assemble pistons 22 with the free ends of the rods 17. The pistons 22 may have piston rings 23. Aligned cylinder sections 24, 25, have cylinder heads 26, in the short connected compact set up of the disclosure herein.

At the outer end of the shaft section 11 is distributor head 27 having electrical connections 28 to spark plugs 29 at the cylinder heads 26.

The shaft section 11, inward from the distributor head 27, has a cam 30 directly acting to thrust a valve stem 31, having a poppet valve terminus or disk 32, in opposition to compression helical spring 33 to open intake port 34 to a chamber 35 about the cylinder section 24. The shaft section 9 adjacent the flyweight disk 12 has fixed thereon a cam 36, adapted at one side to wipe against a pivoted arm 37, and at the opposite side to an oppositely directly pivoted arm 38. The respective arms 37, 38, act against valve stems 39, in opposition to helical compression springs 40 to unseat exhaust poppet valves 41 from seats 42.

There is an air intake 43 (Fig. 1) to a carburetor 44 for commingling with fuel, as gasolene from a tank 45. The commingled fuel and air passes from the carburetor 44 by a duct 46 to the manifold member 6. Passages 47 (Fig. 4) extend in the member 6 to the valve seats 34 for flow past the intake valves 32 into the chambers 35. As the piston 22 moves away from the plate 18, and thus travels in the cylinder 24, toward the head 26, the mixture of fuel and air flowing into the chamber 35 from the intake port 34, is drawn through annular series of ports 48 into the cylinder 24 at the side of the piston 22 toward the yoke, or away from the head 26. As the piston 22 travels clear of the annular extent of ports 49, spaced somewhat from the ports 48, there may be continuation of the in-drawing of fuel and air mixture into the engine cylinder 24, or 25.

For two-cycle functioning in the construction herein disclosed, the intake valve 32 closes timely as the cylinders 24, 25, have the pistons 22 start on their return strokes away from the heads 26. There is thus developed a precompression of supercharging value in the chambers 35. As the piston 22 travels sufficiently to open the ports 49, the convex surface 50 of the piston 22 serves as a deflector for inrushing air-fuel mixture to scavenge the cylinder from combustion charge to exhaust past the now open valve 41 at the exhaust port 42, and thence pass by duct 51 to muffler 52. The arms at the cam 36 have their control so timed that the valve 41 is to close in such stage of the scavenge operation as to conserve the fresh air-fuel charge into the explosion chamber portion of the cylinder as adjacent the head 26. With the piston 22 now acting toward the head 26 in the compression stroke, there is supercharger flow into the cylinder on the opposite side of this double acting piston 22, for as the pressure is reduced in the chamber 35, the intake valve 32 is again opened. The spark plug 29 ignites the compressed fuel and air to effect the firing, and the working stroke of the piston 22 is away from the head 26 in again compressing a supercharge supply, a portion of which is active for scavenging the products of combustion from the cylinder.

The through connection by way of the rods 17 and the slide 16, between a pair of aligned pistons 22, is an efficient set-up for maintaining the respective pistons 22 against tilting and in proper concentric relation at all times to their cylinders. The direct rigid connection, reduces the number of parts, and resultant bearings. Advantage of the short assembly with the double acting functioning for the pistons, has a considerable measure of utility in precompression practice for high speed operation of the motor, even as two-cycle.

Measures may be taken for still further forwarding the matter of speed and rigidity. To such end from a slide 53 (Fig. 6) for the wristpin, a connecting rod 54 as a relatively broad flat section may extend to a piston 55 having a deflector 56 for a mixture of fuel and air from precompression chamber 57 by way of a port 58 into a cylinder 59. The previously burned gases are thus directed to clear from the cylinder 59 by way of an exhaust port 60, normally closed by fin 60' from the piston 55, to an exhaust line 61, extending to a muffler. In lieu of piston rings, L-sections 62 (Fig. 7) may be urged by leaf springs 63, 64, 65, into efficient packing or gland positions. The extent of this flat connecting rod 54 is such that it may take throughout its practical extent direct thrust as to the wristpin regardless as to the position of the wristpin in the slide 53.

A four-cycle adaptation hereunder has the piston 22 (Fig. 8) in a cylinder 66, which at the intake stroke is driving mixed fuel and air past an open valve 67 off its seat 68, into precompression chamber 69 about the cylinder 66, contributing here, as does the chamber 35, to act as a radiator in cooling the explosion chamber and simultaneously warming and thereby increasing the compression for the charge of fuel and air. The chamber 69 has flow therefrom by way of a valve 69' off its seat 70. An exhaust valve 71 is closed at its seat 72, thereby precluding exhaust by way of a duct 73, say to a muffler.

Upon completion of this stroke for filling the cylinder 66 with precompressed fuel and air mixture on the side thereof away from the wristpin, the valves 67, 69', are closed (Fig. 9). The transit of the piston 22 is in the compression stroke, toward a cylinder head 74. During this stroke (Fig. 10), fuel intake valve 75 is open from its seat 76 for mixed fuel and air supply from a carburetor by way of duct 77. This inflow past the valve 75 is into the cylinder 66 on the side of the piston 22 toward a head 78 having a gland or guide 79 for the rod 17. The valves 69', 71, 67, are closed. Before firing or explosion, the valve 75 (Fig. 11) is closed and thereafter the valve 67 is opened in order that the non-fired intake charge opposite from the explosion, may be forced during this working or explosion stroke of the piston 22, out of the cylinder into the precompression chamber 69. As the working stroke of the piston 22 is completed, and there is reversal of transit for the piston 22 and now toward the head 74, the valve 67 is closed (Fig. 12), and the valve 75 opened for inflow draft of fresh fuel and air; while the valve 71 is opened for expelling or scavenging the exhaust from the explosion. The stage thereafter is a repetition of this cycle (Figs. 9-12 inc.).

Adjacent the cam 36, there may be on the shaft section 9 an eccentric 80 (Fig. 2) adapted to actuate a plunger 81 as a pump to force lubricant from a chamber 82 in the base 1 into a duct 83 about the chamber 10 having jets 84 therefrom directed toward the piston rods 17 and the wristpin 15, as well as the bearings 7, 8.

The principle of precompression, with such contributing to the cooling of the cylinder, and developed in a two-cycle single cylinder unit, retains the common values of compactness, low weight per unit of horsepower available, elimination of oscillating parts, reduction of the number of bearings, in an efficient construction.

Figure 14:
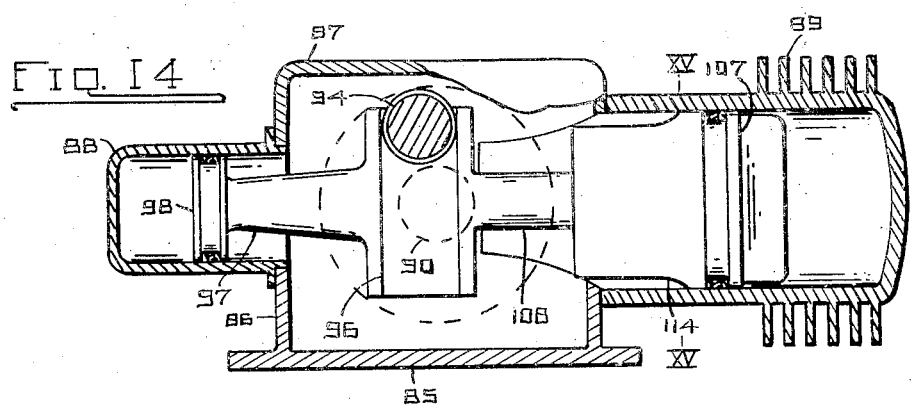
Fig. 14 is a view on the line XIV—XIV, Fig. 13.
Figure 15:
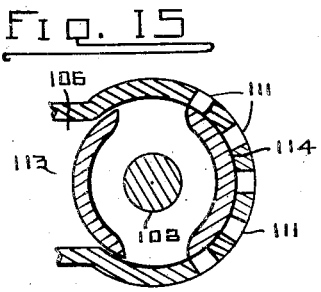
Fig. 15 is a view on the line XV—XV, Fig. 14.

A motor base 85 (Fig. 14) has lower crank case section 86 upon which is mounted complementary or upper crank case section 87. Extending one way therefrom is pump cylinder 88 directly opposite to prime mover explosion cylinder 89 (Figs. 13, 14). Power take-off shaft 90 has fixed thereon a flyweight or balance wheel 91. The shaft 90 has anti-friction bearings 92, 93 in the casing 86, 87, and an outboard crank 94. This crank or wristpin 94 has anti-friction bearing 95 and is operable in slide 96 as an intermediate or yoke section for piston rod portion 97 one way therefrom to a pump piston 98 operable in the pump cylinder 88 for precompressing mixed fuel and air supply to pass therefrom by way of a passage 99 from discharge port 100 at the cylinder 88. A carburetor 101 has delivery into the passage 99, as the piston 98 has its suction stroke toward the shaft 90, open intake check valve 102 against the action of compression helical spring 103.

Upon the reverse action of the pump piston 98, the check valve 102 is closed and the compressed fuel and air is to some extent stored in tapered segment chambers 104, 105, until intake port 106 in the cylinder 89 be opened by a piston 107 having piston rod connection 108 with the slide 96. The pistons 98, 107, are directly connected as a reciprocable unit, each stabilizing the other in its cylinder, for a light weight, short connected power device. The port 106 is from a cooling jacket section 109 extension from the passage 99. A deflector 110 on the piston 107 so directs the precompressed fuel and air mixture that it serves quickly as an effective scavenging means for clearing the cylinder 89 of products of combustion of the preceding power stroke, the discharge of which is by way of distributed ports 111 into exhaust duct 112. From the piston 107, into the chamber 104, there extends a leg or fin 113 as a sort of filler to reduce the volume of the precompressed fuel and air to be stored in the passages between the pump 88, 98, and the motor 89, 107. The proportion of these passages, pump and motor, may be advantageously such that at atmospheric pressure outside conditions, the precompression to the motor may be as much as 15# per square inch, or more.

Operating in conjunction with the leg or fin 113, also directly connected to the piston 107, and diametrically disposed as to the fin 113, is a guide or fin 114. While this fin or leg 114 operates in the chamber 105, additionally it serves to maintain the exhaust ports 111 closed during the power or explosion stroke of the piston 107, which is double acting for compressing fuel and air coming thereinto by way of port 115 from the passage 99 to charge the chambers 104, 105.

Features inherent in the foregoing disclosures are the reduced or low friction, from the reduced or few relatively moving parts, less number of bearings. Side play, or whip from oscillation is not present. The opposed cylinders, thru the rigid connecting rod portions and slide or yoke, establish efficient guide cooperation against any out-of-alignment tendencies. This means there is longer cylinder life due to out-of-true wearing being thus avoided. This stabilization is seemingly increased by having the power piston double acting; coupling the advantages therewith not only of piston cooling, but having this cooling or radiation characteristic carried to some extent about the explosion cylinder by the precompressed fuel and air supply. Such supply as thus warmed, is expanded, thereby additionally contributing to power efficiency.

The precompressing, or supercharging, is a factor for the same dimension of ports to respond to more effective scavenging, as well as higher speed motor operation. Accordingly, this is a further feature for increased horsepower per unit of weight, beyond that of the short or close connection features. Simplicity in construction extends these advantages into manufacturing economies, and for a wide type of plural motor groupings, even for pancake, in-line, radial and V-type. The valves may be of various types beyond the poppet and piston opened, even into valve-in-head, T-valve, slide valve, oscillating.

Furthermore it is to be noted, there is simplicity in solving lubrication, with minimizing of disturbing factors therefrom. There is absent any tendency of the pistons tending to pump oil into the fuel. The port proportioning or valve timing may accurately insure no waste of fuel as well as proper purity for the compression charge as freed of scavenge products.

Notwithstanding the relatively high speeds attainable hereunder, there is such interconnection of the moving parts that dynamic out-of-balance problems are not disturbing. Here again, the short or close connection and fewer parts are factors in aid of values in design herefrom.

The feature of lubrication is handled entirely apart from the fuel or any direct mingling therewith, that is as supplied through the carburetor. In some operations, sufficient lubricant is supplied by way of the jets 83 (Fig. 1), with the splash or seepage therefrom ample for operating conditions.

It is to be noted, due to the double acting piston in the four-cycle disclosure, there is actually recompression in the chamber 69. The charging stroke of the piston 22 (Fig. 8) effects a first or initial compression into the chamber 69, and such is husbanded with the compression from the explosion stroke.

A compression capacity beyond the double acting piston also takes place as to the piston 107. Its fin or leg 113 has clearance 116 (Fig. 13) for inflow or free flow as to the port 115. The extent of precompression charge is thus a build-up from the non-firing side of the piston 107, supplemented by the capacity elected for the piston 98. At the high speed of operation hereunder, due to the precompression there is made possible a widened range for motor functioning, even into rarer atmosphere conditions, especially as involving altitude in aviation practices.

Incidental to a convenient mode of lubrication into the cylinders from the crank or slide chamber, there may be a port 117 (Fig. 13) to receive oil splash, conduct such by a way 118 to radial way 119 for flow-out to the piston rings.

What is claimed and it is desired to secure by Letters Patent is:

1. A motor block crank case base, a crank shaft therein, a pair of aligned cylinders radially of the shaft and mounted with the base, an integral assembly of a pair of pistons and piston rods from the cylinders to an intermediate transverse yoke for the crank, there being remote heads for the cylinders, one at least of said cylinders between its remote head and its piston providing an explosion chamber, said base providing a head for one cylinder, said head having a gland in proximity to the explosion chamber side of the piston, said gland being for the piston rod at the opposite side of the explosion chamber piston in thus providing a precompression chamber having said gland side of said chamber close up to the piston at precompression.

2. A piston and cylinder device comprising a crank, a yoke on the crank, aligned piston rods from the yoke, a double acting piston on each rod, aligned cylinders for the pistons, remote heads for the cylinders for said cylinders and pistons thereby to complete explosion chambers for an internal combustion motor, and inner cylinder heads with piston rod glands providing precompression chambers having a major cylinder surface alternately common with the explosion chambers in providing additional heat exchange from the cylinder wall to the precompression charge.

3. A piston and cylinder device comprising a crank, a yoke thereabout, piston rods oppositely extending from the yoke, disk pistons on the rods, cylinders for the pistons, heads for the cylinders between the yoke and pistons, said heads having glands for the piston rods approximately abutted by the yoke at explosion position of a piston in its cylinder and by the piston at the other limit position of the piston in thereby providing a precompression chamber to a major extent common with the explosion chamber in increased temperature build up therefrom for the precompression charge.

WILLIAM H. COOK.